Sept. 18, 1956 J. A. MACDONALD ET AL 2,763,834
ELECTRICAL TESTING DEVICES
Filed June 30, 1952 3 Sheets-Sheet 1
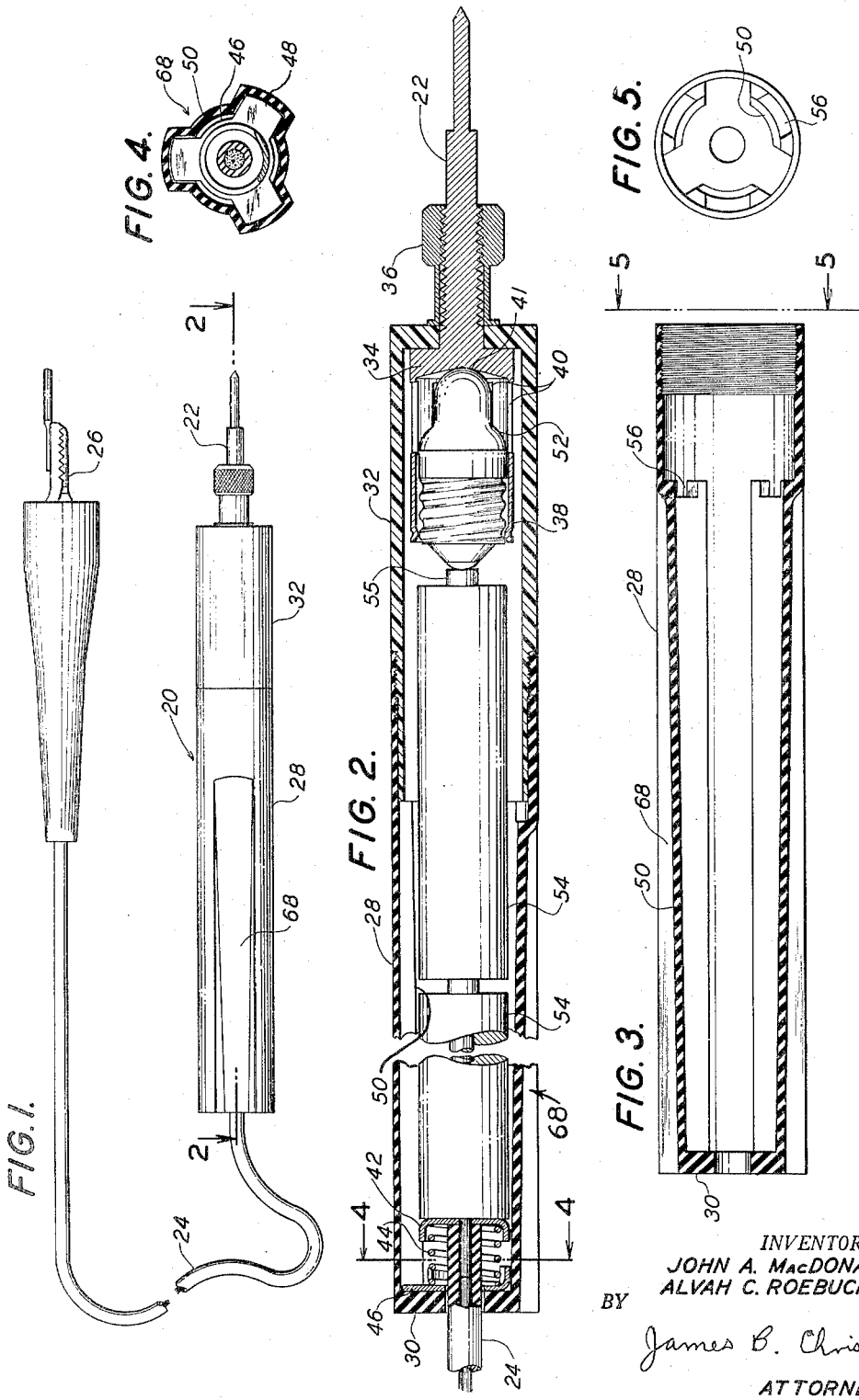
INVENTORS.
JOHN A. MacDONALD
ALVAH C. ROEBUCK, JR.
BY James B. Christie
ATTORNEY Sept. 18, 1956 J. A. MACDONALD ET AL 2,763,834
ELECTRICAL TESTING DEVICES
Filed June 30, 1952 3 Sheets-Sheet 2
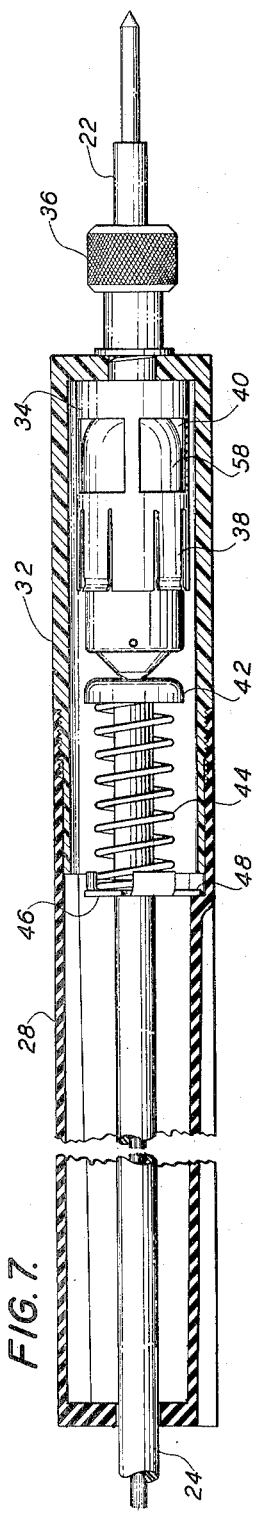
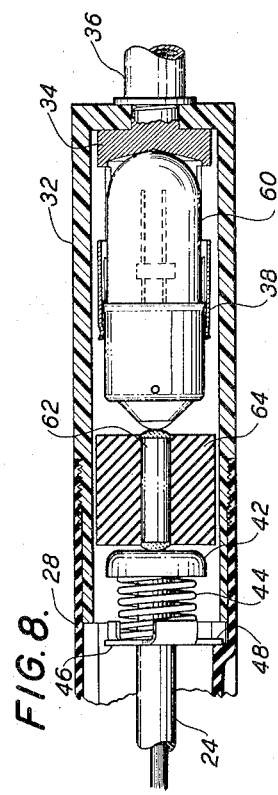
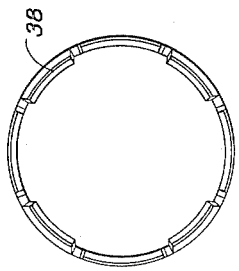
INVENTORS.
JOHN A. MacDONALD
ALVAH C. ROEBUCK, JR.
BY
James B. Christie
ATTORNEY

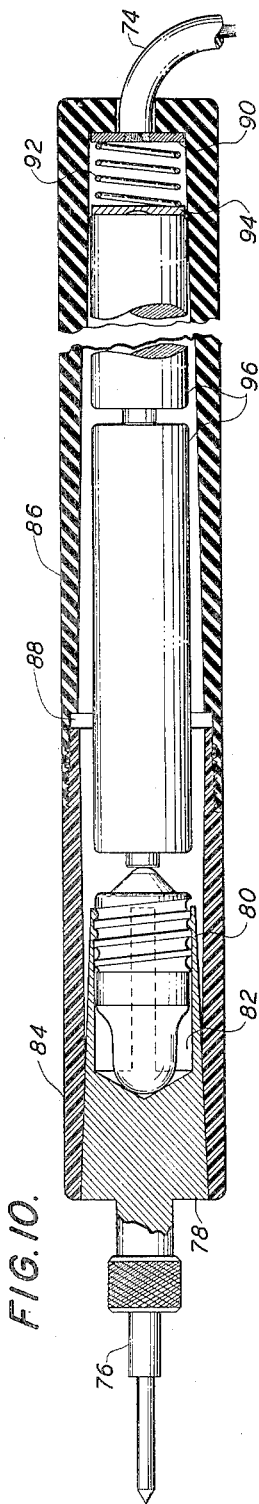
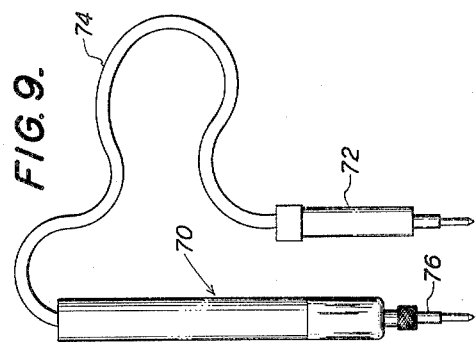
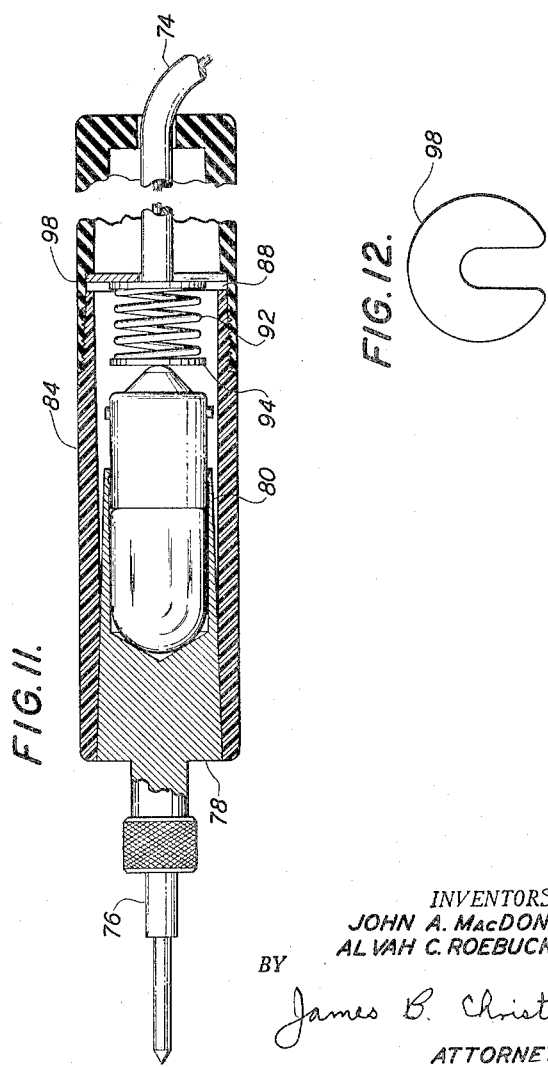
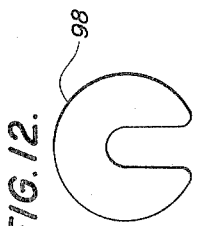

United States Patent Office 2,763,834
Patented Sept. 18, 1956

2,763,834

ELECTRICAL TESTING DEVICES

John A. Macdonald, Glendale, and Alvah C. Roebuck, Jr., Tujunga, Calif.

Application June 30, 1952, Serial No. 296,322

13 Claims. (Cl. 324—53)

This invention relates to electrical testers, and particularly to improvements in electrical testing devices employing lamps for indicating electrical conditions.

The electrical tester of our invention is small and of light weight so that it may be carried with ease, yet the tester is veratile in that it may be employed to test continuity in a wide range of voltages.

The apparatus of our invention is readily convertible for testing either dead or live circuits, and it is of such construction that the electrical connections within the testing device are not impaired even though numerous conversions from one type of operation to another are made, and even though the apparatus is subjected to rough usage.

The tester employs interchangeable lamps, and the lamp holder is arranged so that the various lamps may be inserted with ease even though lamps having different bases are employed. The lamp holder is arranged so that the light which the testing device produces can be seen from any operating position.

Briefly, the electrical tester of our invention comprises a tubular casing having a closure at one end and being open at the other end, a hollow transparent cap providing a closure for the open end of the casing, a lamp holder located in the transparent cap and having a conductive probe extending through the end of the cap, a conductive terminal located inside the tubular casing, a wire connected to the conductive terminal and extending through the closure at the end of the casing opposite the cap, and resilient means for supporting the conductive terminal from two spaced locations in the tubular casing.

One of the locations for supporting the conductive terminal is adjacent the closed end of the tubular casing so that batteries may be employed between the conductive terminal and the base of the lamp. With such an arrangement the tester is self-energized and it may be employed to test continuity.

The other location for supporting the conductive terminal is adjacent the cap at the open end of the tubular casing, so that the resilient means serves to force the conductive terminal against the base terminal of a lamp in the holder. With this arrangement the tester may be employed to check low voltage circuits.

In order to check circuits which are energized with higher voltages, the resilient means is compressed somewhat and a resistor is employed between the conductive terminal and the base of the lamp so as to permit the use of a neon lamp as the indicator.

The invention is explained with reference to the drawings, in which:

Fig. 1 is a perspective view of one embodiment of the invention;

Fig. 2 is a longitudinal sectional view along line 2—2 of Fig. 1 showing the tester arranged to check continuity;

Fig. 3 is an enlarged view of the tubular casing of the tester shown in Fig. 2;

Fig. 4 is a sectional view along line 4—4 of Fig. 2;

Fig. 5 is an end view along line 5—5 of Fig. 3;

Fig. 6 is an end view of the lamp holder;

Fig. 7 shows the tester arranged to check live circuits with a lamp having a conventional filament;

Fig. 8 shows the tester arranged to test live circuits with a neon lamp; and

Figs. 9 to 12 show an alternative construction for the electrical tester.

The electrical tester of Fig. 1 comprises a test unit 20 having a probe 22 extending from one end and a wire 24 extending from the other end of the unit. An alligator clip 26 is connected to the wire, and the clip 26 and probe 22 are employed to make electrical contact with the circuit which is to be tested.

The test unit comprises a tubular casing 28 having a closure 30 at one end and being open at the other end. A hollow transparent cap 32 serves to provide a closure for the open end of the tubular casing. Preferably, the cap 32 is connected to the tubular casing 28 by a threaded joint so that the cap is installed by screwing it into the tubular casing.

The probe 22 carries a lamp holder 34 as an integral part thereof. A nut 36 is provided for securing the holder and probe to the cap 32. Preferably, the nut 36 is knurled so that it can be removed by hand when it is necessary to change the lamp in the holder 34.

The lamp holder is provided with a plurality of flexible fingers 38 for engaging the peripheral contact of the lamp, as shown more clearly in Figs. 6 and 7, and with a plurality of apertures 40 located around the bulb of the lamp for transmitting light radially through the transparent cap. The end 41 of the lamp holder is shaped so that the end of the lamp may be forced against it without causing unreasonable stresses in the glass bulb.

The wire 24 is connected to a conductive terminal 42 located inside the tubular casing, and a spring 44 is provided for resiliently supporting the conductive terminal inside the tubular casing.

A cap or washer 46 is affixed to the other end of the spring 44. The washer 46 has a plurality of projections 48 which may be positioned between a plurality of internal ribs 50 which extend longitudinally in the tubular casing.

When the testing device is employed to test continuity, a conventional flashlight lamp 52 is employed, and the lamp is energized by batteries 54 located inside the testing device, as shown in Fig. 2.

With this arrangement, the washer 46 is oriented so that the projections 48 are positioned between the internal ribs 50 of the tubular casing. Thus, the washer 46 abuts against the end 30 of the tubular casing, and the spring 44 forces the batteries toward the bulb. The center terminal 55 of one of the batteries is forced against the bottom contact of the lamp, and the bulb of the lamp is forced against the end 41 of the holder. Thus, good electrical connections are assured throughout the testing device.

The ends of the internal ribs 50 in the tubular casing are provided with identations 56 for accommodating the projections 48 on the washer 46 when the testing device is employed to check live circuits.

Fig. 7 shows the test unit arranged for checking live circuits of low voltage, say up to 48 volts. The batteries are omitted, and a lamp 58 is inserted in the lamp holder. Filament lamps ranging in voltage from 1½ to 48 volts are commercially available in the small sizes required for the tester. Some of these lamps are provided with screw type bases, and others have bayonet type bases, as shown in Fig. 7. The flexible fingers 38 of the holder will accommodate either type lamp, and they serve to provide a positive connection to the peripheral terminal of the lamps.

In order to cause the conductive terminal 42 to contact the bottom terminal of the lamp, the washer 46 is oriented so that the projections 48 on the washer engage the indentations 56 in the ends of the ribs in the tubular casing. Thus, the conductive terminal 42 is supported at a location adjacent the end of the tubular casing at which the cap 32 is located. With this arrangement for supporting the conductive terminal 42 from two different locations in the tubular casing, a short spring 44 may be employed and a positive connection is assured for each type of operation of the tester.

Fig. 8 shows the test unit arranged to test live circuits of high voltage, say from 65 to 600 volts. With this arrangement a neon bulb 60 is employed in the holder, and a resistor 62 is disposed between the bottom contact of the neon lamp and the conductive terminal 42. The resistor is located in a cylindrical shaped member 64 which is composed of an insulating material and which serves to position the resistor inside the cap 32. The spring 44 is sufficiently resilient to accommodate the resistor unit without permanently deforming the spring.

The tubular member 28 and the transparent cap 32 of the tester shown in Figs. 1 to 8 are composed of an insulating material such as plastic. Preferably, the tubular member 28 is provided with a plurality of grooves 68 which are substantially coextensive with the terminal ribs so that the cross-sectional thickness of the tubular casing is substantially uniform throughout the length of the ribs. With such an arrangement, the shrinkage of the plastic is substantially uniform and the tubular casing remains undistorted after it is removed from the mold in which it is formed. Also, the grooves 68 permit an operator to hold the tester with greater ease.

The alternative embodiment of the invention shown in Fig. 9 comprises a test unit 70 which is similar to that shown in Fig. 1. A probe 72 is shown attached to the wire 74 of the tester to illustrate a variation in the structural arrangement of the testing device. If desired, an alligator clip, as shown in Fig. 1, may be employed at the end of the wire 74.

The test unit 70 has a probe 76 extending from one end of the device, and the probe carries a lamp holder 78. As before, the lamp holder has a plurality of flexible fingers 80 for engaging the peripheral contact of the lamp, and a plurality of apertures 82 for transmitting light from the lamp. However, in this embodiment of the invention the holder 78 is press-fit into a transparent tubular cap 84. A tubular casing 86 engages the cap 84 by a threaded joint, and the two members are arranged to provide an annular groove 88 at the junction between the two members when they are joined together. Preferably the casing 86 and the cap 84 are composed of an insulating material such as plastic. The wire 74 is connected to a washer 90 which carries a spring 92. A conductive terminal 94 is connected to the spring.

Fig. 10 shows this embodiment of the invention arranged to check continuity. The lamp is energized by means of the batteries 96.

Fig. 11 shows this embodiment of the invention arranged to check live circuits. The batteries are omitted, and the conductive terminal 94 is supported from a location adjacent the transparent cap 84. In order to support the conductive terminal at this location, a washer 98 (see Fig. 12) is inserted in the annular groove 88, so that the washer 90 rests upon the washer 98. The wire 74 extends through a slot in the washer 98.

It will be apparent that the embodiment of the invention shown in Figs. 9 to 12 may employ a neon lamp and resistor in a manner similar to that shown in Fig. 8, if desired.

In both embodiments of the invention, the spring loaded conductive terminal is supported from either of two locations in the tubular casing so that a short spring may be employed, thereby providing reliable electrical contacts for each type of operation.

Also, both embodiments of the invention employ a lamp holder having flexible fingers for engaging the peripheral contact of the lamp, so that various types of lamps may be employed.

We claim:

1. An electrical tester comprising a tubular casing having a closure at one end and being open at the other end, a hollow transparent cap providing a closure for the open end of the casing, a lamp holder located in the cap and having a conductive probe as an integral part thereof extending through the end of the cap, the lamp holder having a plurality of flexible fingers for engaging the peripheral contact of a lamp, a conductive terminal located inside the tubular casing, resilient means for selectively supporting said conductive terminal from either of two spaced locations in the tubular casing for testing dead and live circuits respectively, and a wire connected to said conductive terminal and extending through the closure at the end of the casing opposite the cap.

2. An electrical tester comprising a tubular casing having at closure at one end and being open at the other end, a hollow transparent cap providing a closure for the open end of the casing, a lamp holder located in the cap and having a plurality of apertures for transmitting light through the transparent cap, a conductive probe affixed to the lamp holder and extending through the end of the cap, a conductive terminal located inside the tubular casing, a wire connected to said conductive terminal and extending through the closure at the end of the casing opposite the cap, and resilient means for supporting the conductive terminal adjacent the end of the tubular casing which is opposite the transparent cap when batteries are employed in the tester and for supporting the conductive terminal adjacent the lamp holder when the tester is employed to test circuits which are energized by an external source.

3. The apparatus of claim 2, wherein the lamp holder has a hollow interior terminating in a solid end portion shaped to receive the bulb of a lamp, the lamp holder also having a plurality of flexible fingers extending away from the probe for engaging the peripheral contact of a lamp.

4. An electrical tester comprising a tubular casing having a closure at one end and being open at the other end, a hollow transparent cap providing a closure for the open end of the casing, a lamp holder located in the cap and having a conductive probe as an integral part thereof extending through the end of the cap, the lamp holder having a plurality of flexible fingers at the end opposite the probe for engaging the peripheral contact of a lamp and also having a plurality of apertures for transmitting light radially through the transparent cap, a conductive terminal located inside the tubular casing, spring means for resiliently supporting said conductive terminal from either of two spaced locations in the tubular casing for testing dead and live circuits respectively, and a wire connected to said conductive terminal and extending through the closure at the end of the casing opposite the cap.

5. An electrical tester comprising a tubular casing having a closure at one end and being open at the other end, a hollow transparent cap providing a closure for said other end of the casing, a lamp holder located in the cap and having a conductive probe extending through the end of the cap, a wire extending through the closure at the end of the casing opposite the cap, a conductive terminal located inside the casing and connected to the end of said wire, a coil spring located around said wire and having one end arranged to abut against said terminal, and means operable to support the spring adjacent the end of the tubular member at which the cap is located for testing live circuits.

6. The apparatus of claim 5, further including means operable to support the spring adjacent the end of the tubular member which is opposite the end at which the cap is located for testing live circuits.

7. The apparatus of claim 5, wherein the lamp holder comprises a substantially cylindrical hollow member having a plurality of fingers at the end opposite said probe for engaging the peripheral contact of a lamp, the member also having a plurality of apertures in its cylindrical wall for transmitting light from the interior of the member through the transparent cap.

8. An electrical tester comprising a tubular casing having a closure at one end and being open at the other end, a hollow transparent cap providing a closure for the open end of the casing, a lamp holder located in the cap and having a conductive probe as an integral part thereof extending through the end of the cap, the portion of the probe adjacent the cap being threaded, a nut located on the threaded portion of the probe for securing the lamp holder to the cap, a conductive terminal located inside the tubular casing, spring means for selectively supporting said conductive terminal from either of two spaced locations in the tubular member for testing dead and live circuits respectively, and a wire connected to said conductive terminal and extending through the closure at the end of the casing opposite the cap.

9. An electrical tester comprising a tubular casing having a closure at one end and being open at the other end, the casing having a plurality of internal ribs extending longitudinally therein, a hollow transparent cap providing a closure for the open end of the casing, a lamp holder located in the cap and having a conductive probe as an integral part thereof extending through the end of the cap, a wire extending through the end of the casing opposite the cap, a conductive terminal located inside the casing and connected to the end of said wire, a coil spring located around said wire and having one end affixed to said terminal, and a washer affixed to the other end of the spring and having a plurality of projections thereon adapted to be positioned between the internal ribs in the casing when oriented in one position and adapted to engage the ends of the ribs when oriented in another position.

10. The apparatus of claim 9, wherein the ends of the ribs which are engaged by the projections on the washer are indented to receive said projections.

11. The apparatus of claim 9, wherein the tubular casing is composed of a plastic and the outer surface of the tubular casing is provided with grooves which are substantially coextensive with the internal ribs so that the cross-sectional thickness of the tubular casing is substantially uniform throughout the length of the ribs.

12. An electrical tester comprising an elongated hollow casing having a closure at one end, a hollow cylindrical cap composed of a transparent material providing a closure for the other end of the casing, a conductive probe extending through the end of the cap, a lamp a holder for the lamp located in the cap and arranged to transmit light from the lamp radially through the transparent material of the cap, the lamp holder and probe being an integral unit and serving to provide an electrical connection between the peripheral contact of the lamp and the probe, a wire extending through the closure at the end of the casing opposite the cap, a conductive terminal located inside the casing and connected to the end of said wire, a coil spring located around said wire and having one end affixed to said terminal, a washer affixed to the other end of the spring, means for supporting the washer adjacent the end of the casing opposite the transparent cap when batteries are employed in the tester, and means for supporting the washer adjacent the transparent cap so that the conductive terminal on the wire contacts the bottom terminal of the lamp when the tester is energized from an external source.

13. An electrical tester comprising a tubular casing having a closure at one end and being open at the other end, a hollow transparent cap providing a closure for the open end of the casing, a lamp holder located in the cap and having a conductive probe as an integral part thereof extending through the end of the cap, a lamp, the lamp holder having a plurality of flexible fingers engaging the peripheral contact of the lamp, a conductive terminal located inside the tubular casing, spring means for resiliently supporting said conductive terminal adjacent the cap at the end of the tubular casing for testing live circuits, a removable resistor unit connected in series with the lamp and located between said conductive terminal and the base of the lamp for providing an electrical connection between the conductive terminal and the bottom terminal of the lamp, and a wire connected to the conductive terminal and extending through the closure at the end of the casing opposite the cap.

References Cited in the file of this patent

UNITED STATES PATENTS

| | | |
|---|---|---|
| 1,459,336 | Link | June 19, 1923 |
| 1,721,365 | Zwetsch | July 16, 1929 |
| 1,957,802 | Rabezzana | May 8, 1934 |
| 2,413,484 | Berger | Dec. 31, 1946 |

FOREIGN PATENTS

| | | |
|---|---|---|
| 556,296 | Great Britain | Sept. 29, 1943 |